United States Patent
Ferreol et al.

(10) Patent No.: US 7,019,635 B2
(45) Date of Patent: Mar. 28, 2006

(54) METHOD AND DEVICE FOR THE DETECTION OF SOURCES IN A COMMUNICATIONS SYSTEM

(75) Inventors: Anne Ferreol, Colombes (FR); François Delaveau, Le Plessis S/Marne (FR)

(73) Assignee: Thales, Paris (FR)

( * ) Notice: Subject to any disclaimer, the term of this patent is extended or adjusted under 35 U.S.C. 154(b) by 406 days.

(21) Appl. No.: 10/234,457

(22) Filed: Sep. 5, 2002

(65) Prior Publication Data

US 2003/0086510 A1 May 8, 2003

(30) Foreign Application Priority Data

Sep. 5, 2001 (FR) .......................................... 01 11486

(51) Int. Cl.
*G08B 29/00* (2006.01)

(52) U.S. Cl. .................... 340/507; 340/10.1; 340/825.7; 340/870.11; 340/870.12; 342/442; 370/329; 370/346; 375/347; 455/456.1; 455/562.1

(58) Field of Classification Search ................. 342/361, 342/373, 442, 457, 417, 453; 375/347; 370/431, 370/329, 346; 340/507, 539.1, 539.21, 870.11, 340/870.12, 825.7, 825.52, 10.1, 10.4; 455/431, 455/456.1, 456, 457, 562
See application file for complete search history.

(56) References Cited

U.S. PATENT DOCUMENTS

| 5,752,168 | A | 5/1998 | Monot et al. |
|---|---|---|---|
| 6,205,341 | B1 | 3/2001 | Monot et al. |
| 6,239,746 | B1 | 5/2001 | Pipon et al. |
| 6,240,098 | B1 | 5/2001 | Thibault et al. |
| 6,253,084 | B1 | 6/2001 | Monot |
| 6,349,207 | B1 | 2/2002 | Monot et al. |
| 6,430,239 | B1 * | 8/2002 | Ferreol ...................... 375/347 |
| 6,442,384 | B1 * | 8/2002 | Shah et al. ................. 455/423 |
| 6,498,936 | B1 * | 12/2002 | Raith ......................... 455/466 |
| 6,735,436 | B1 * | 5/2004 | McCauley et al. .......... 455/424 |

OTHER PUBLICATIONS

U.S. Appl. No. 10/132,225, filed Apr. 26, 2002, Pending.
U.S. Appl. No. 10/204,562, filed Aug. 22, 2002, Pending.
U.S. Appl. No. 10/234,161, filed Sep. 5, 2002, Pending.
U.S. Appl. No. 10/234,457, filed Sep. 5, 2002, Pending.
W. Chen, et al. "Detection of the number of signals in noise with banded Covariance matrices", IEE Proceedings: Radar, Sonar & Navigation, Institution of Electrical Engineers, vol. 143, No. 5, Oct. 3, 1996, pp. 289–294.

(Continued)

*Primary Examiner*—Davetta W. Goins
(74) *Attorney, Agent, or Firm*—Oblon, Spivak, McClelland, Maier & Neustadt, P.C.

(57) ABSTRACT

A method for the detection of $M_0$ sources common to several observations $\underline{u}(t)$ and $\underline{v}(t)$ within a single array of sensors, the observations having different lengths $N_1$ and $N_2$, comprises at least the following steps: defining a law of likelihood $V_{uv}([M=M_0]/M_0)$ substantially equal to the chi-2 law with $2(N_1-M_0)(N_2-M_0)$ degrees of freedom with $N_1 \leq N_2$, $\dim\{\underline{u}(t)\}=N_1\times 1$ and $\dim\{\underline{v}(t)\}=N_2\times 1$; determining a detection threshold $\alpha_M$ in order to obtain a low probability of false alarms and a number of degrees of freedom that takes account of the lengths $N_1$ and $N_2$ and of the number of sources $M_0$; determining the presence and/or the number of the sources $M_0$ in applying the law of likelihood and the threshold $\alpha_M$. The method and device can be applied to the determining of the presence and/or the number of sources common to at least two observations having different lengths in a GSM type radiocommunications system.

7 Claims, 2 Drawing Sheets

OTHER PUBLICATIONS

Mati Wax, et al. "Detection of the Number of Coherent Signals by the MDL Principle", IEEE Transactions on Acoustics, Speech, and Signal Processing, vol. 37, No. 8, Aug. 1989, pp. 1190–1196.

A. Swindlehurst, "Alternative algorithm for maximum likelihood DOA estimation and detection", IEE Proceedings: Radar, Sonar & Navigation, Institution of Electrical Engineers, vol. 141, No. 6, Dec. 01, 1994, pp. 293–299.

Chia–Chang Ll, "Estimating the Number of Signals by Chi–Square Statistics", ICASSP 88: 1988 International Conference on Acoustics, Speech, and Signal Processing, vol. 4, Apr. 1988, pp. 2336–2339.

F. Cesbron, et al. "Locating GSM mobiles using antenna array", Electronics Letters, vol. 34, No. 16, Aug. 6, 1998, pp. 1539–1540.

* cited by examiner

METHOD AND DEVICE FOR THE DETECTION OF SOURCES IN A COMMUNICATIONS SYSTEM

BACKGROUND OF THE INVENTION

1. Field of the Invention

The present invention relates to a method for determining the presence of transmitter sources and, as the case may be, their number in a system comprising at least one receiver receiving signals coming from radiocommunications transmitters.

It can be applied especially in the field of antenna processing where a system consisting of several antennas receives signals coming from radiocommunications transmitters. The signals sent are, for example, digital modulations comprising one or more synchronization signals.

It can also be applied in the field of the direction-finding or estimation of the angles of arrival of signals from RF sources, in order to obtain the values of incidence either of mobile sources or of base stations.

The detection of the number of sources present makes it possible especially to implement methods of high-resolution direction-finding.

The invention also relates to the field of adaptive filtering and of equalization for telecommunications. In particular, it relates to the techniques of synchronization with known reference sequences such as the TSC (Training Sequence Channel) or SCH (Synchronization Channel) sequences used in the GSM standard. These synchronization techniques make use of notions of detection.

2. Description of the Prior Art

There are known, prior art ways of estimating the number $M_0$ of sources in a radiocommunications system.

For example, a standard estimation method consists of the application of a MUSIC type algorithm, known to those skilled in the art. For this purpose, it is necessary to know the number of incident sources which is equal to the rank of the covariance matrix $R_{xx}=E[\underline{x}(t)\underline{x}(t)^H]$ of the signals $\underline{x}(t)$ received by the sensors. The rank of the covariance matrix of the sensor signals $\underline{x}(t)$ is determined from an estimate of this matrix on T statistically independent samples $\underline{x}(t_k)$:

$$\hat{R}_{xx} = \frac{1}{T}\sum_{k=1}^{T} \underline{x}(t_k)\underline{x}(t_k)^H \quad (1)$$

such that $$\underline{x}(t) = \sum_{m=1}^{M_0} \underline{a}(u_m)s_m^0(t) + \underline{b}(t),$$

with $\underline{b}(t)$ being the Gaussian white noise, m the index of the transmitter or the transmitter source, $\underline{a}(u_m)$ the direction vector of the incidence source $u_m$ and $s_m^0(t)$ the signal transmitted by this $m^{th}$ source. A source may be a multipath source coming from the transmitter.

In the presence of $M_0$ sources with a Gaussian time signal $\underline{x}(t_k)$, the likelihood ratio, $V_{classic}(M=M_0/M_0)$, using the $N-M_0$ lowest eigenvalues of the matrix $\hat{R}_{xx}$, follows a chi-2 relationship with $(N-M_0)^2-1$ degrees of freedom, given that:

$$V_{classic}(M/M_0) = -2T\left[\ln\left(\prod_{m=M+1}^{N}\lambda_m\right) - (N-M)\ln(\hat{\sigma}^2)\right] \quad (2)$$

with $\hat{\sigma}^2 = \frac{1}{N-M}\sum_{m=M_0+1}^{N}\lambda_m$ $\lambda_m$: eigenvalue of $\hat{R}_{xx}$ for $1 \leq m \leq N$
N: number of sensors of the reception system or number of reception channels.
This gives a likelihood law:

$$V_{classic}([M=M_0]/M_0) \sim \text{Chi-2 at } (N-M_0)^2-1 \text{ with dim}\{\underline{x}(t)\}=N \quad (3)$$

Knowledge of the law of probability of $V_{classic}(M_0/M_0)$ makes it possible to fix the threshold $\alpha_M$ for which the probability of having a number of sources strictly greater than M sources is close to 1 ($p_d \sim 1$): the thresholds $\alpha_M$ are chosen in the chi-2 table with a low probability of false alarms $p_{fa}$ and a number of degrees of freedom equal to $(N-M)^2-1$. With the law of probability $V_{classic}(M_0/M_0)$ being known, it is sought to take the maximum value of the random variable $V_{classic}(M_0/M_0)$ so that $V_{classic}(M_0/M_0) < \alpha_M$ with a probability of $1-p_{fa}$. It is then possible to construct the following detection test:

if $V_{classic}(M/M_0) \geq \alpha_M$, the number of sources $M_0$ present is greater than M,
if $V_{classic}(M/M_0) < \alpha_M$, the number of sources $M_0$ present is smaller than or equal to M.

To determine the number of sources $M_0$, first the presence of M=0 sources is tested, then that of M=1 until $V_{classic}(M/M_0)$ is lower than the threshold $\alpha_M$. The number of sources then corresponds to the value verifying the inequality: if $V_{classic}(M/M_0) < \alpha_M$ then $M_0=M$ is taken. It is recalled that this statistical detection test can work only when the noise $\underline{b}(t)$ is white, namely when its covariance matrix verifies:

$$R_{bb}=E[\underline{b}(t)\underline{b}(t)^H]=\sigma^2 I$$

where I is the N×N-sized unit matrix.

There is also a known prior art method for estimating the number $M_0$ of sources common to two observations $\underline{u}(t)$ and $\underline{v}(t)$ of a same length.

In this case, it is necessary to know the rank of an intercorrelation matrix $R_{uv}=E[\underline{u}(t)\underline{v}(t)^H]$ between observations $\underline{u}(t)$ and $\underline{v}(t)$ recorded on an array of N sensors capable of performing reference direction-finding algorithms. Indeed, a reference sequence of a mobile may appear at the instants $t_0$ and $t_0+T_{frame}$ where $T_{frame}$ designates the length of a GSM frame, for example. In these conditions, it is possible to build an intercorrelation matrix $R_{uv}$ with non-zero energy from the signals $\underline{u}(t)=\underline{x}(t-t_0)$ and $\underline{v}(t)=\underline{x}(t-t_0-T_{frame})$.

In general, it is sought to determine the number $M_0$ of sources common to the signals $\underline{u}(t)$ and $\underline{v}(t)$ such that:

$$\underline{u}(t) = \sum_{m=1}^{M_0}\underline{a}(u_m)s_m^0(t)+\underline{b}_u(t) \text{ and } \underline{v}(t) = \sum_{m=1}^{M_0}\underline{a}(u_m)s_m^0(t)+\underline{b}_v(t) \quad (4)$$

The observations $\underline{u}(t)$ and $\underline{v}(t)$ are distinguished by the noise vectors $\underline{b}_u(t)$ and $\underline{b}_v(t)$ constituted by background noise as well as interferers received independently on $\underline{u}(t)$ and $\underline{v}(t)$. The vectors $\underline{b}_u(t)$ and $\underline{b}_v(t)$ are statistically decorrelated and Gaussian. The method determines the rank of the matrix $R_{uv}$ from an estimate of this matrix on T samples $\underline{u}(t_k)$ and then $\underline{v}(t_k)$ that are statistically independent:

$$\hat{R}_{uv} = \frac{1}{T}\sum_{k=1}^{T} \underline{u}(t_k)\underline{v}(t_k)^H \quad (5)$$

To know the rank of the matrix $\hat{R}_{uv}$, the rank of its standardized form R is estimated. In the presence of $M_0$ sources with Gaussian time signals $\underline{u}(t_k)$ and $\underline{v}(t_k)$, the likelihood ratio $V_{uv}(M=M_0/M_0)$ using the $N-M_0$ lowest eigenvalues of R follows a chi-2 relationship with $2(N-M_0)^2$ degrees of freedom. This likelihood ratio verifies:

$$V_{uv}(M/M_0) = -2T\ln\left(\left[\prod_{m=M+1}^{N} \mu_m\right]\right) \quad (6)$$

where $\mu_m$ is an eigenvalue of $R=I-UU^H$ classified in descending order for $1 \leq m \leq N$, N being the number of sensors. The matrix U is built from vectors $\underline{u}(t_k)$ and $\underline{v}(t_k)$ as follows:

$U = \hat{R}_{uu}^{-1/2} \hat{R}_{uv} \hat{R}_{vv}^{-1/2}$ such that:

$$\hat{R}_{uu} = \frac{1}{T}\sum_{k=1}^{T}\underline{u}(t_k)\underline{u}(t_k)^H \text{ and } \hat{R}_{vv} = \frac{1}{T}\sum_{k=1}^{T}\underline{v}(t_k)\underline{v}(t_k)^H$$

The likelihood relationship is then expressed as follows (7): $V_{uv}(M=M_0/M_0)$~Chi-2 with $2(N-M_0)^2$ degrees of freedom with $\dim\{\underline{u}(t)\}=\dim\{\underline{v}(t)\}=N\times 1$ Knowledge of the law of probability of $V_{uv}(M_0/M_0)$ makes it possible to fix the threshold $\alpha_M$ for which the probability of having a number of sources strictly greater than M sources is close to 1 ($p_d$~1): the thresholds $\alpha_M$ are chosen in the chi-2 table with a low probability of false alarms $p_{fa}$ and a number of degrees of freedom equal to $2(N-M)^2$. With the law of probability $V_{uv}(M_0/M_0)$ being known, it is sought to take the maximum value of the random variable $V_{uv}(M_0/M_0)$ so that $V_{uv}(M_0/M_0)<\alpha_M$ with a probability of $1-p_{fa}$. It is then possible to construct the following detection test:

if $V_{uv}(M/M_0)>\alpha_M$, the number of sources $M_0$ present is greater than M, if $V_{uv}(M/M_0)<\alpha_M$, the number of sources $M_0$ present is smaller than or equal to M.

To determine the number of sources $M_0$, first the presence of M=0 sources is tested, then that of M=1 until $V_{uv}(M/M_0)$ is lower than the threshold $\alpha_M$. The number of sources then corresponds to the value verifying the inequality: if $V_{uv}(M/M_0)<\alpha_M$ then $M_0=M$ is taken.

While the methods described in the prior art give good results in certain cases, they are nevertheless limited in their application. For example, they cannot be used to detect the presence and/or number of sources common to several observations $\underline{u}(t)$ and $\underline{v}(t)$ having different lengths.

SUMMARY OF THE INVENTION

The present invention proposes especially to determine the presence and number of sources or transmitters common to several observations of different lengths $N_1, N_2, \ldots$ within a system comprising at least one array of is $N=N_1$ sensors.

The object of the invention relates to a method for the detection of $M_0$ sources common to several observations $\underline{u}(t)$ and $\underline{v}(t)$ within a single array of sensors, the observations having different lengths $N_1$ and $N_2$, characterized in that it comprises at least the following steps:

defining a law of likelihood $V_{uv}([M=M_0]/M_0)$~Chi-2 with $2(N_1-M_0)(N_2-M_0)$ degrees of freedom with $N_1 \leq N_2$, $\dim\{\underline{u}(t)\}=N_1\times 1$ and $\dim\{\underline{v}(t)\}=N_2\times 1$, determining a detection threshold $\alpha_M$ in order to obtain a low probability of false alarms and a number of degrees of freedom that takes account of the lengths $N_1$ and $N_2$ and of the number of sources $M_0$, determining the presence and/or the number of the sources $M_0$ in applying the law of likelihood and the threshold $\alpha_M$.

The observation vector $\underline{v}(t)$ is determined, for example, by means of a processor from the observation vector $\underline{u}(t)$ received at the array of sensors.

According to another alternative mode of implementation:

the signals sent out by the different sources $M_0$ comprise a reference sequence d(t), the reference vector $\underline{r}^1_L(t-t_0)$ is taken as the observation vector $\underline{u}(t)$ with $N_1=L$ and the vector $\underline{x}(t)$ received at the sensors is taken as the observation vector $\underline{v}(t)$ with $N_2=N$ (L corresponds to the number of time shifts of the reference signal), the synchronization position or positions are determined.

According to another variant, the method comprises a step for determining the number Pm of multipaths for a given transmitter m in searching for consistency between the observations $\underline{x}^m(t)$ and the reference vector $\underline{r}^m_L(t)$ and verifying $\underline{u}(t)=\underline{r}^m_L(t)$ and $\dim\{\underline{u}(t)\}=N_1\times 1$ with $N_1=L$.

The method can be applied to a GSM type radiocommunications system.

The invention also relates to a device by which the above-mentioned method can be implemented.

The object of the present invention offers especially the following advantages:

the possibility of detecting the presence and, possibly, the number of sources common to observations having different lengths, obtained on a different number of sensors, determining the sync positions for the case of transmitters propagating along several multipaths, determining the number of multipaths Pm of a transmitter.

BRIEF DESCRIPTION OF THE DRAWINGS

Other features and advantages shall appear from the following detailed description of an embodiment taken by way of an illustrative example that in no way restricts the scope of the invention. This description is illustrated by the appended drawings, of which.

MORE DETAILED DESCRIPTION

For a clearer understanding of the principle implemented in the present invention, the following description is given by way of an illustration that in no way restricts the scope of the invention, in the context of a radiocommunications network using signals comprising a synchronization signal, or reference signal. These signals are, for example, GSM type signals.

Figure 1:
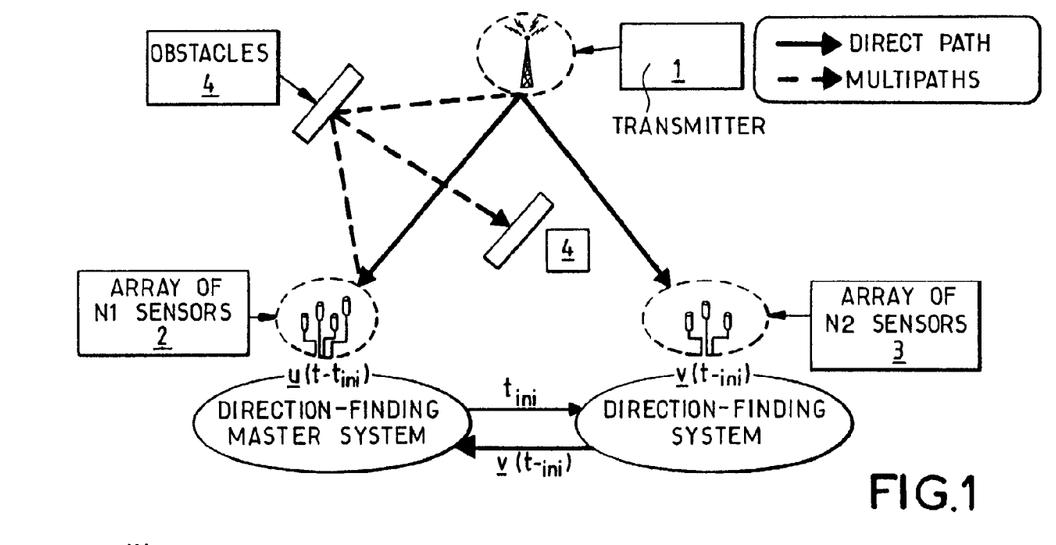
FIG. 1 shows an exemplary radio communications system comprising a transmitter source and two base stations, each equipped with an array of sensors.

FIG. 1 exemplifies a communications system comprising a transmitter source 1, a base station 2 equipped with an array of $N_1$ sensors and a base station 3 equipped with an array of $N_2$ sensors, with $N_1$ being preferably different from $N_2$. The sensors receive the signals coming from the transmitter source which may correspond to direct paths (shown in solid lines in the figure) or paths with reflection (shown in dashes) on obstacles 4. These signals correspond to what are called "observations" in the description. The $N_1$ and $N_2$ sensors constitute the reception channels.

One of the two base stations, for example the station 2 in the figure, is a master station. The result of this is that it recovers the signals, acquired at the other base station 3, for example by wire connection. It is then provided with a processor for the execution especially of the different steps of the method according to the invention, as well as for the execution of the direction-finding operations or other signal-processing operations. Furthermore, the master station 2 sends the other station the instant of acquisition of the first sample, for example by a wire connection or by radio, so as to make the acquisitions of the two stations synchronous. The second station is then provided with a processor used to acquire signals at the given instant and also to communicate with the master station. The two direction-finding systems with which the stations are equipped receive the direct path in common.

Without departing from the framework of the invention, the communications system comprises, for example, only one array of $N_1$=N sensors receiving an observation $\underline{u}(t)$ and equipped with a processor. This processor is adapted so that, from this observation $\underline{u}(t)$ with a length N equal to the number of sensors, it can determine an observation vector $\underline{v}(t)$ with a length $N_2$=M different from N.

The idea of the invention can be applied, for example, to observations $\underline{u}(t)$ and $\underline{v}(t)$ of different lengths, respectively designated as $N_1$ and $N_2$.

The description makes use of the notion of the observation vector. An observation vector with a length $N_1$ or $N_2$ is constituted by sensor signals $x_n(t)$ (or by the reference signal $d_m(t)$ as well as by one or more delayed versions $x_n(t-k)$ (and $d_m(t-k)$ respectively of this signal). Without a delayed version, the signals received at a array of sensors constitute an observation vector with a length equal to the number of sensors. The observation vectors $\underline{u}(t)$ and $\underline{v}(t)$ are constituted by signals whose composition depends on the application. The observations $\underline{u}(t)$ and $\underline{v}(t)$ have the following structure (8):

$$\underline{u}(t) = \sum_{m=1}^{M_0} \underline{a}(u_m)s_m^0(t) + \underline{b}_u(t) \text{ and } \underline{v}(t) = \sum_{m=1}^{M_0} \underline{c}(u_m)s_m^0(t) + \underline{b}_v(t)$$

with dim$\{\underline{u}(t)\}$=$N_1$×1 and dim$\{\underline{v}(t)\}$=$N_2$×1

$\underline{a}(u_m)$ is for example the direction vector of the array of $N_1$ sensors for the incidence source $u_m$.

$\underline{c}(u_m)$ is, for example, the direction vector of the array of $N_2$ sensors for the same incidence source $u_m$.

$M_0$ corresponds to the number of common sources of the observations $\underline{u}(t)$ and $\underline{v}(t)$.

The noises $\underline{b}_u(t)$ and $\underline{b}_v(t)$ consist, for example, of background noise as well as interferers received independently on the two observation vectors.

The number $M_0$ of sources found corresponds to the rank of the specific covariance matrix $R_{uv}$=E$[\underline{u}(t) \underline{v}(t)^H]$ used to carry out a direction-finding operation.

It is therefore sought to find out the rank of the $N_1$×$N_2$-sized intercorrelation matrix $R_{uv}$=E$[\underline{u}(t) \underline{v}(t)^H]$ that has the property, in the context of the present invention, of being non-squared because $N_1$ is different from $N_2$.

The method according to the invention relies on the following principle: it has been discovered that the likelihood ratio $V_{uv}([M=M_0]/M_0)$ using the $N_1-M_0$ lowest singular values of R (standardized form of the matrix) follows a chi-2 law taking account of the lengths of each of the observation vectors concerned, hence a chi-2 law with $2(N_1-M_0)(N_2-M_0)$ degrees of freedom. When $N_1 \leq N_2$, this likelihood ratio verifies:

$$V_{uv}(M/M_0) = -2t\ln\left(\left[\prod_{m=M+1}^{N_1} \mu_m\right]\right) \quad (9)$$

where $\mu_m$ is eigenvalue of R=I-UU$^H$ classified in descending order for $1 \leq m \leq N_1$, with $N_1$ being the number of sensors of the observation array $\underline{u}(t_k)$ and I the identity matrix sized $N_1$×$N_1$. The matrix U is built from the vectors $\underline{u}(t_k)$ and $\underline{v}(t_k)$ as follows:

$U = \hat{R}_{uu}^{-1/2} \hat{R}_{uv} \hat{R}_{vv}^{-1/2}$ such that:

$$\hat{R}_{uu} = \frac{1}{T}\sum_{k=1}^{T} \underline{u}(t_k)\underline{u}(t_k)^H \text{ and } \hat{R}_{vv} = \frac{1}{T}\sum_{k=1}^{T} \underline{v}(t_k)\underline{v}(t_k)^H \quad (10)$$

The processor of the master station or master array of sensors (for example, the array of observation vectors $\underline{u}(t_k)$) memorizes a law of likelihood having the following expression:

$V_{uv}([M=M_0]/M_0)$~Chi-2 with $2(N_1-M_0)(N_2-M_0)$ degrees of freedom with $N_1 \leq N_2$, dim$\{\underline{u}(t)\}$=$N_1$×1 and dim$\{\underline{v}(t)\}$=$N_2$×1. (11)

From the knowledge of the law of probability of likelihood $V_{uv}([M=M_0]/M_0)$, this processor determines a threshold value $\alpha_M$ for which the probability of having strictly more than M sources is close to 1 ($p_d$~1): the thresholds $\alpha_M$ are chosen in the chi-2 table with a low probability of false alarm $p_{fa}$ and a number of degrees of freedom equal to $2(N_1-M_0)(N_2-M_0)$. With the law of $V_{uv}(M/M)$ being known, the method considers the maximum value $\alpha_M$ of the random variable $V_{uv}(M/M)$ so that $V_{uv}(M/M)<\alpha_M$ with a probability of $1-p_{fa}$. From these threshold values $\alpha_M$ ($\alpha_0$, $\alpha_1$, . . . ), the processor carries out the following detection test:

If $V_{uv}(M/M_0) \geq \alpha_M$, the number of sources $M_0$ present is greater than M, If $V_{uv}(M/M_0) < \alpha_M$, the number of sources $M_0$ present is smaller than or equal to M.

To determine the number of sources $M_0$, the processor starts by testing the presence of M=0 sources, then M=1 until $V_{uv}(M/M_0)$ is below the threshold $\alpha_M$. It is deduced from this, in the method, that M=$M_0$.

Figure 3:
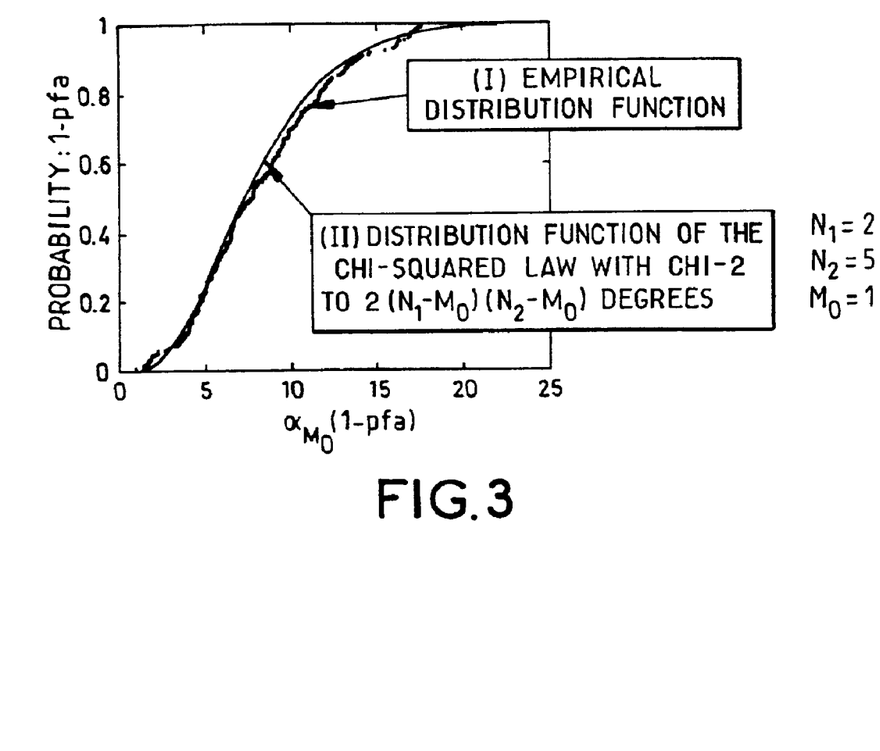

FIG. 3 shows the threshold $\alpha_{M0}$(pfa) as a function of the probability pfa and two curves (I, II) respectively representing the empirical distribution function (I) and the distribution function (II) used in the method according to the invention, for $N_1$=2, $N_2$=5 and $M_0$=1 (which corresponds to a single source). The empirical distribution function has been determined by computing 100 times the random variable $V_{uv}(M=M_0/M_0)$ with different noise events or instances $\underline{b}_u(t)$ and $\underline{b}_v(t)$, and the probability pfa has been obtained as follows:

$$pfa = \frac{1}{nb} \underset{1 \leq k \leq nb}{number}(V_{uv}(M = M_0/M_0)_k > \alpha_{M0}) \quad (12)$$

with $V_{uv}(M=M_0/M_0)_k$ being the likelihood ratio computed to the $k^{th}$ instance.

The superimposition or coincidence of these two curves (I) and (II) proves that the law of $V_{uv}(M=M_0/M_0)$ is truly a chi-2 law with $2(N_1-M_0)(N_2-M_0)$ degrees of freedom.

The method can thus be used to obtain the number $M_0$ of sources common to observation vectors with different lengths $N_1$ and $N_2$.

The method according to the invention thus makes it possible to obtain instants of synchronization or the number of multipaths associated with a transmitter.

To make it easier to understand the invention, and before giving a detailed description of certain of its specific applications, a few points concerning the signals shall be recalled. The present invention brings several transmitters of signals $s_m(t)$ into play, each comprising a reference signal $d_m(t)$.

Figure 2:
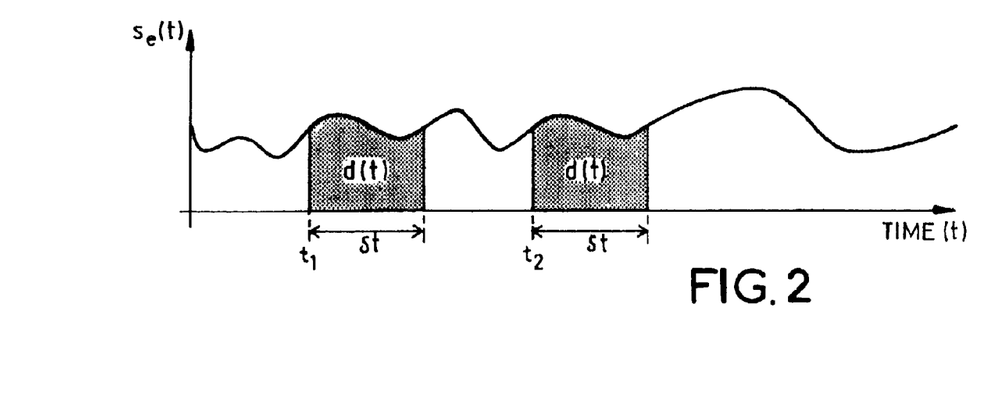
FIG. 2 shows an exemplary signal comprising a reference signal d(t), FIG. 3 show results validating the method according to the invention.

FIG. 2 shows a signal structure $s_e(t)$ comprising a known reference signal $d(t)$ on a time range such that:

$d(t)=s_e(t-t_k)$ pour $0<t<\delta t$ and $k=1,2$, where $\delta t$ corresponds to the time duration of the sequence or reference signal.

Thus, between the two points in time $t_k$ and $t_k+\delta t$, the signal sent by the transmitter is the synchronization signal $d(t)$ for various instants $t_1, t_2, \ldots$ etc.

Model of the Signal Received by the Sensors

In the presence of $M_0$ useful transmitters, the signal received at the sensors is expressed as follows:

$$\underline{x}(t) = \sum_{m=1}^{M_0} H_m^u \underline{r}_L^m(t) + \underline{b}^{M0}(t) = H_u \underline{r}_L^u(t) + \underline{b}^{M0}(t) \quad (13)$$

where $\underline{b}^{M0}(t) = \sum_{m'=M_0+1}^{M} H_{m'} \underline{s}_L^{m'}(t) + \underline{b}(t)$ where $H_u = [H_1^u \ldots H_{M0}^u]$ and $\underline{r}_L^u(t) = \begin{bmatrix} \underline{r}_L^1(t) \\ \vdots \\ \underline{r}_L^{M0}(t) \end{bmatrix}$ The exponent u refers to the useful signals.

The matrices representing the transmission channel $H_m^u$ and $H_{m'}$ have the following expression (14):

$$H_m^u = \sum_{p=1}^{P_m} \rho_{mp} \underline{a}(\underline{u}_{mp}) h_{mp}^{uT} = A_m B_m^u$$

and $H_{m'} = \sum_{p=1}^{P_{m'}} \rho_{m'p} \underline{a}(\underline{u}_{m'p}) h_{m'p}^T = A_{m'} B_{m'}$ Where $A_m = [\underline{a}(u_{m1}) \ldots \underline{a}(u_{mPm})]$ is the matrix of the direction vectors of the multipaths of the $m^{th}$ transmitter, $B_m^{uT} = [\rho_{m1} h_{m1}^u \ldots \rho_{mPm} h_{mPm}^u]$ and $B_{m'}^T = [\rho_{m'1} h_{m'1} \ldots \rho_{m'Pm'} h_{m'Pm'}]$, $u_{mp}$ is the incidence of the $p^{th}$ path of the $m^{th}$ user. $P_m$ corresponds to the number of multipaths of the $m^{th}$ transmitter. The goal of the present invention, in particular, is to estimate this parameter for $1 \leq m \leq M_0$.

The reference vector $\underline{r}_L^m(t)$ is formed by the reference signal $d_m(t)$, in being defined, for example, for two useful transmitters as follows:

$$\underline{r}_L^1(t) = \begin{bmatrix} d_1(t - (L/2)Te) \\ \vdots \\ d_1(t + (L/2)Te) \end{bmatrix} \quad (15)$$

and $\underline{r}_L^2(t) = \begin{bmatrix} d_1(t + \Delta t_{12} - (L/2)Te) \\ \vdots \\ d_1(t + \Delta t_{12} + (L/2)Te) \end{bmatrix}$ where Te is the sampling period.

L=the number of time shifts of the reference signal. Optimally L should be chosen so that it is equal to the temporal spread of the channel of the transmitter with the greatest spread.

$\Delta t_{ij} = t_k(j) - t_k(i)$ is the difference corresponding to two reference signals $d_i(t)$ and $d_j(t)$ detected at the respective instants $t_k(i)$ and $t_k(j)$ and corresponding to the two users, in this case $\Delta t_{12}$.

Figure 4:
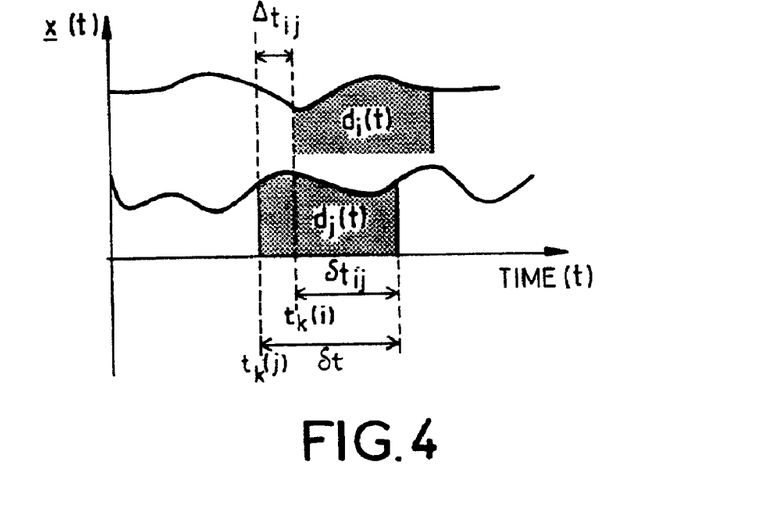
FIG. 4 is a graph giving a schematic view of the temporal overlapping of signals that appear at two different instants.

FIG. 4 shows this temporal overlap.

Application of the Method to the Detection of the Sync Positions in the Case of Multipaths The signals sent are propagated along several multipaths, for example with a time spread close to the symbol time (rate of transmission of the symbols of a digital signal). When the time spread is close to the symbol time, the multipaths are correlated.

Given that the reference sequence $d(t)$ is present between the instants $t_k$ and $t_k+\delta t$ and that the multipaths and interferences are noise, $\underline{x}(t)$ is written as follows:

$$\underline{x}(t) = \underline{a}(u_0) d(t-t_k) + \underline{b}'(t) \quad (16)$$

where $\underline{a}(u_0)$ is the direction vector of the direct path with an incidence $u_0$ and $t_k$ is the instant of appearance of the reference signal transmitted by this path, and $\underline{b}'(t)$ is constituted by a mixture of noise and interference According to the expressions (13) and (16), the signal is expressed for example in the form:

$$\underline{x}(t) = H_1^u \underline{r}_L^1(t - t_k) + \underline{b}'(t) = \sum_{p=1}^{P_1} \rho_{1p} \underline{a}(u_{1p}) s_{1p}(t - t_k) + b'(t) \quad (17)$$

with:

$\rho_{1p}$ being the attenuation factor of the $p^{th}$ path and $u_{1p}$ being its incidence.

$$\underline{b}'(t) = \sum_{m=2}^{M_0} H_m^u \underline{r}_L^m(t) + \underline{b}^{M0}(t) \text{ according to (13)}$$

$\underline{r}_L^1(t) = \begin{bmatrix} d_1(t - (L/2)Te) \\ \vdots \\ d_1(t + (L/2)Te) \end{bmatrix}$ and $s_{1p}(t) = h_{1p}^T \underline{r}_L^1(t) = \rho_{1p} d_1(t - \tau_{1p})$ $\underline{b}'(t)$ is formed by the mixture of noise and interference and $t_k$ is the sync position of the first path of this transmitter, in writing $t_k = \tau_{1p}$. Each path has an incidence $u_{1p}$ and a delay $\tau_{1p}$. The temporal spread of the channel is therefore equal $$L + \max_{i,j}[|\tau_{1i} - \tau_{1j}|].$$

In assuming that the reference vector $\underline{r}^1_L(t-t_0)$ is synchronized at $t_0$ in verifying $\underline{x}(t)=H_1{}^u\underline{r}^1_L(t-t_0)$, the method according to the invention can by applied by writing:

$$\underline{u}(t) = \underline{r}^1_L(t - t_0) \text{ with } N_1 = L \text{ and } \underline{v}(t) = \underline{x}(t) \text{ with } N_2 = N \quad (18)$$

$N_1$ is equal to the number of time shifts of the reference signal $d_1(t)$ and $N_2$ is equal to the number $N$ of sensors of the base station 3.

Given that, for the synchronization, the presence or absence of the signal $\underline{r}^1_L(t-t_0)$ has to be verified, the following two assumptions will be tested:

$H_0$: $\underline{x}(t) \rightarrow \underline{b}'(t) \rightarrow$ Absence of reference signal at $t_0$
$H_1$: $\underline{x}(t) \rightarrow H_1{}^u\underline{r}^1_L(t-t_0) + \underline{b}'(t) \rightarrow$ Presence of the reference signal $d_1(t)$ at $t_0$ and synchronization with the first path.

Thus the likelihood ratio $V_{uv}(M=0/M_0)(t_0)$ is computed as follows:

$$V_{uv}(M=0/M_0)(t_0) = -2\delta t \ln(\det(I_L - R_{xd}(t_0)^H R_{xx}(t_0)^{-1} R_{xd}(t_0) R_{dd}(t_0)^{-1})) \quad (19)$$

with: $R_{xx}(t_0) =$ $$\frac{1}{\delta t} \sum_{t=t_0}^{t_0+\delta t} \underline{x}(t)(\underline{x}(t))^H \quad R_{xd}(t_0) = \frac{1}{\delta t} \sum_{t=t_0}^{t_0+\delta t} \underline{x}(t)(\underline{r}^1_L(t-t_0))^H$$

$$R_{dd} = \frac{1}{\delta t} \sum_{t=t_0}^{t_0+\delta t} \underline{r}^1_L(t-t_0)\underline{r}^1_L(t-t_0)^H$$

Where $I_L$ designates the identity matrix sized $L \times L$. In this case $\delta t = T$, $U = R_{dd}^{-1/2} R_{xd}(t_0)^H R_{xx}(t_0)^{-1/2}$ and it is deduced from this that:

$$V_{uv}(M = 0/M_0) = -2 \delta t \ln\left(\left[\prod_{m=1}^{N_1=L} \mu_m\right]\right) \quad (20)$$

$$= -2 \delta t \ln(\det(I_L - UU^H))$$

$$= -2 \delta t \ln(\det(I_L - R_{dd}(t_0)^{1/2} R_{xd}(t_0)^H R_{xx}(t_0)^{-1} R_{xd}(t_0) R_{dd}(t_0)^{-1/2H}))$$

$$= -2 \delta t \ln(\det(I_L - R_{xd}(t_0)^H R_{xx}(t_0)^{-1} R_{xd}(t_0) R_{dd}(t_0)^{-1}))$$

Since, in the assumption $H_0$ where $M=M_0=0$, the random variable $V_{uv}(M/M_0)(t_0)$ follows a chi-2 relationship with $2(N_1-M)(N_2-M)=2NL$, a detection threshold $\alpha_0$ is detected from this with a probability of false alarm pfa such that:

If $V_{uv}(M/M_0)(t_0) \geq \alpha_0(\text{pfa},L) \rightarrow \underline{r}^1_L(t-t_0)$ is detected and to is in a sync position because this comes under the assumption $H_0$.

If $V_{uv}(M/M_0)(t_0) < \alpha_0(\text{pfa},L) \rightarrow$ there is no detection because this comes under assumption $H_1$.

The threshold $\alpha_0(\text{pfa},L)$ is chosen in a chi-2 table for a probability pfa and a number of degrees of freedom equal to 2NL. For its implementation, the method computes the following criterion $C_L(t_0)$ as a function of $t_0$:

$$C_L(t_0) = 1 - \det(I_L - R_{xd}(t_0)^H R_{xx}(t_0)^{-1} R_{xd}(t_0) R_{dd}(t_0)^{-1}) \quad (21)$$

Given that, in the assumption $H_1$, the likelihood ratio verifies $-2\delta t \ln(1-C_L(t_0))=V_{uv}(M/M_0)(t_0) > \alpha_0(\text{pfa},L)$, it is sought to obtain the maximum values $t_k$ of $C_L(t_k)$ verifying the expression:

$$C_L(t_k) > \eta(\text{pfa}, L) \text{ with } \eta(\text{pfa}, L) = 1 - \exp\left\{\frac{-\alpha_0(\text{pfa}, L)}{2\delta t}\right\} \quad (22)$$

The sync positions $t_k$ then correspond to the instants of appearance of the reference vector $\underline{r}^1_L(t)$ and thus of the reference signal $d_1(t)$. These instants may then be used to implement a single-reference or multiple-reference direction-finding operation.

Application to the Detection of the Number of Sources Associated with the Same Cyclical Parameters According to one alternative mode of implementation of the invention, the method can be used to determine the number $M_0$ of sources associated with the same cyclical parameters. In considering the $N_1 \times 1$-sized observation vector $x(t)$ received at an array of $N_1$ sensors and a second $N_2 \times 1$-sized observation vector $y(t)$ where $N_2 \neq N_1$ such that:

$$\underline{x}(t) = \sum_{m=1}^{M_0} \underline{a}(u_m) s_m^0(t) + \underline{b}_u(t) \text{ and } \underline{y}(t) = \sum_{m=1}^{M_0} \underline{c}(u_m) s_m^0(t) + \underline{b}_v(t) \quad (23)$$

Where the $M_0$ signal sources $s_m^0(t)$ are associated with the same cyclical parameters in verifying, for $(\alpha,\tau)$ and/or $(\beta,\tau)$:

$$r_m(\alpha,\tau) = <E[s_m^0(t) s_m^0(t-\tau)^*]\exp(j2\pi\alpha t)> \neq 0$$

and/or $$c_m(\beta,\tau) = <E[s_m^0(t) s_m^0(t-\tau)]\exp(j2\pi\beta t)> \neq 0 \quad (24)$$

where $E[\ ]$ designates the mathematical expectation and $<>$ the temporal mean. Thus, the ranks of the following intercorrelation matrices are equal to $M_0$:

$$R_{xy}(\alpha,\tau) = <E[\underline{x}(t)\underline{y}(t-\tau)^H]\exp(j2\pi\alpha t)> \text{ with } \text{rank}(R_{xy}(\alpha,\tau)) = M_0 \quad (25)$$

and/or $$C_{xy}(\beta,\tau) = <E[\underline{x}(t)\underline{y}(t-\tau)^T]\exp(j2\pi\beta t)> \text{ with } \text{rank}(C_{xy}(\beta,\tau)) = M_0 \quad (26)$$

Given that the estimators of these matrices on T samples verify:

$$\hat{R}_{xy}(\alpha, \tau) = \frac{1}{T}\sum_{k=1}^{T} \underline{x}(t_k)\underline{y}(t_k - \tau)^H \exp(j2\pi\alpha t_k) \quad (27)$$

$$\hat{C}_{xy}(\beta, \tau) = \frac{1}{T}\sum_{k=1}^{T} \underline{x}(t_k)\underline{y}(t_k - \tau)^T \exp(j2\pi\beta t_k) \quad (28)$$

Thus, to determine $M_0$, the method of the equations (9–12) can be implemented by writing either:

$$\underline{u}(t) = \underline{x}(t) \text{ and } \underline{v}(t) = \underline{y}(t-\tau)\exp(-j2\pi\alpha t) \quad (29)$$

or:

$$\underline{u}(t) = \underline{x}(t) \text{ and } \underline{v}(t) = \underline{y}(t-\tau)^*\exp(j2\pi\beta t) \quad (30)$$

The vector y(t) is derived either from a sub-array of the array of sensors of the observation x(t) or from another array derived from another array formed by $N_2$ sensors.

Application to the Detection of the Number of Multipaths Pm for Single-User or Multiple-User Direction Finding According to another alternative mode of implementation of the invention, the method is used to determine the number of multipaths coming from a transmitter. The signal sent out by a source or mobile gets propagated, in the majority of cases, along several paths, namely direct paths or reflective paths.

The method can be used, for example, to determine the number of multipaths of a transmitter of a known signal $d_m(t)$ or reference signal included in the frame of the signal from the observation vector $\underline{x}(t)$ received by the array of sensors.

A transmitter is constituted, for example, by several sources and the model of the signal is written in the form:

$$\underline{x}(t) = \sum_{m=1}^{M_0}\sum_{p=1}^{P_m} \rho_{mp}\underline{a}(u_{mp})h_{mp}^{uT}\underline{r}_L^m(t) + \underline{b}^{MO}(t) \text{ with} \quad (31)$$

$$\underline{b}^{MO}(t) = \sum_{m'=M_0+1}^{M}\sum_{p=1}^{P_{m'}} \rho_{m'p}\underline{a}(u_{m'p})h_{m'p}^T s_L^{m'}(t) + \underline{b}(t)$$

where $\underline{b}^{MO}(t)$ is the component of the signal comprising the noise and the interferers. Given that the transfer function $H_m^u$ of the $m^{th}$ transmitter verifies the following relationship:

$$H_m^u = \sum_{p=1}^{P_m} \rho_{mp}\underline{a}(u_{mp})h_{mp}^T \quad (32)$$

After the method has been used to estimate the transfer functions $H_m^u$ of the transmitters for $1 \leq m \leq M_0$, the signal of the $m^{th}$ transmitter can be isolated by performing the following operation:

$$\underline{x}^m(t) = \underline{x}(t) - \sum_{m=m'}^{M_0} H_{m'}^u \underline{r}_L^{m'}(t) \quad (33)$$

The transfer functions are estimated by implementing a method described here below in the paragraph "Separation of the transmitters or useful transmitters" by which the transfer matrices $H_m^u$ of each of the transmitters can be identified separately. The knowledge of the transfer matrices of all the transmitters thus makes it possible to isolate the signal $x^m(t)$ of the $m^{th}$ transmitter. The method then consists, for example, of the application of the principle of detection of the number Pm of multipaths to the signal $x^m(t)$. According to the expression (9), it is deduced therefrom that the signal $\underline{x}^m(t)$ verifies the expression:

$$\underline{x}^m(t) = H_m^u \underline{r}_L^m(t) + \underline{b}^{MO}(t) = \sum_{p=1}^{P_m} \rho_{mp}\underline{a}(u_{mp})s_{mp}(t) + \underline{b}^{MO}(t) \quad (34)$$

with $\underline{r}_L^m(t) = \begin{bmatrix} d_m(t-(L/2)Te) \\ d_m(t+(L/2)Te) \end{bmatrix}$ and $s_{mp}(t) = h_{mp}^T \underline{r}_L^m(t) = \rho_{mp}r_m(t-\tau_{mp})$ where $P_m$ designates the number of multipaths, $s_{mp}(t)$ the signal of the $p^{th}$ path and $u_{mp}$ its incidence. It is recalled that the signal $\underline{x}^m(t)$ is derived from a multiple-user technique isolating the signal of the $m^{th}$ user. Given that the number of interference sources $M_b$ is equal to:

$$M_b = \sum_{m'=M_0+1}^{M} P'_m \text{ with } P_m + M_b = M_T \quad (35)$$

$M_b$ is then the number of sources of the observation vector $\underline{b}^{MO}(t)$. The goal of the detection test is to estimate the number of multipaths $P_m$ of the $m^{th}$ transmitter. In all cases, first of all, the number $M_T$ of incident sources is detected. The reference signal $d_m(t)$ enables the construction of the reference vector $\underline{r}^m_L(t)$. The purpose of the detection is to find consistency between the observations $\underline{x}^m(t)$ and the reference vector $\underline{r}^m_L(t)$. We take:

$$\underline{u}(t) = \underline{r}^m_L(t) \dim\{\underline{u}(t)\} = N_1 \times 1 \text{ with } N_1 = L \quad (36)$$

L corresponds to the number of time shifts of the reference signal $d_m(t)$.

The rank of the covariance matrix of the signal $\underline{b}^{MO}(t)$ is equal to $M_T - P_m$: This matrix $R_{bb}$ is computed from the signals $\underline{x}(t)$ and $\underline{r}^u_L(t)$ as described here above. After a breakdown into eigen elements of $R_{bb}$, an extraction is made of the of the $N \times (N-(M_T-P_m))$-sized unit matrix $P_{roj}(P_m)$ orthogonal to all the direction vectors $\underline{a}(u_{m'p})$ of the interference sources such that:

$$P_{roj}(P_m)^H \underline{a}(u_{m'p}) = 0 \text{ for } m' > M_0 \quad (37)$$

where the $\underline{a}(u_{m'p})$ are the direction vectors of the interferers. The unit matrix $P_{roj}(P_m)$ is formed by the $N-(M_T-P_m)$ eigen vectors of $R_{bb}$ associated with the smallest eigenvalues. The vector $\underline{v}(t)$ is constructed as follows:

$\underline{v}(t) = P_{roj}(M_u)^H \underline{x}^m(t) = H_m^p \underline{r}^m_L(t) + \underline{b}^p(t)$ $\dim\{\underline{v}(t)\} = N_2 \times 1 \text{ with } N_2 = N-(M_T-P_m) \quad (38)$ where $H_m^p = P_{roj}(P_m)^H H_m^u$ and $\underline{b}^p(t) = P_{roj}(P_m)^H \underline{b}(t)$ N is the number of sensors of the base station 3 and $M_T$ is the total number of sources and $P_m$ the number of multipaths of the $n^{th}$ transmitter.

The signals $\underline{u}(t)$ and $\underline{v}(t)$ have the signal $\underline{r}^m_L(t)$ in common. In these conditions, the number $P_m$ of multipaths of the $m^{th}$ transmitter is estimated by implementing the detection test described here above, in choosing special values for the lengths $N_1$ and $N_2$ of the observations.

The method builds the likelihood ratio $V_{uv}(M/P_m)$ by choosing $N_1 = L$ and $N_2 = N-(M_T-P_m)$. This leads to the following law of probability:

$V_{uv}([M=P_m]/P_m) \sim \text{Chi-2}$ with $2(L-P_m)(N-M_T) = 2(L-P_m)(N_2-P_m)$ degrees of freedom (39).

The knowledge of the statistics of $V_{uv}(M=P_m/P_m)$ makes it possible to choose the thresholds $\alpha_M$ (M=0, 1, ... ) in the chi-2 table with a probability of false alarm fixed at $p_{fa}$ and a number of degrees of freedom equal to $2(L-P_m)(N-M_T)$. The test is the following:

if $V_{uv}(M/P_m) \geq \alpha_M$ the number of sources $P_m$ present is greater than M, if $V_{uv}(M/P_m) < \alpha_M$ the number of sources $P_m$ present is smaller than or equal to M.

The steps of the detection test are then the following:

Step No. 1: Computation of $R_{bb}$ according to the expression (41) given here below Step No. 2: $\underline{u}(t) = \underline{r}^m_L(t)$ and M=0

Step No. 3: Computation of $P_{roj}(M)$ from $R_{bb}$

Step No. 4: Computation of $\underline{v}(t) = P_{roj}(M)^H \underline{x}^m(t)$

Step No. 5: Computation of $V_{uv}(M/P_m)$

Step No. 6: →if $V_{uv}(M/P_m) \geq \alpha_M$ then M=M+1 and return to the step No. 3

→if $V_{uv}(M/P_m) < \alpha_M$ then $P_m = M$ and stopping of the detection test.

Separation of the Transmitters or Useful Transmitters

The separation of the transmitters consists in estimating the transfer matrix $H_u = [H_1^u \ldots H_{M0}^u]$ and then extracting the matrices $H_m^u$, associated with each of the $M_0$ useful transmitters, from $H_u$. The method estimates the matrix $H_u$ according to the least error squares method as in the single-user case. Thus, according to the expression (13), the method estimates $H_u$ in minimizing the difference between $H_u \underline{r}^u_L(t)$ and $\underline{x}(t)$. By obtaining this least error square value between the instants $t_{min}$ and $t_{max}$ we get:

$$\hat{H}_u = \hat{R}^u_{xr}(\hat{R}^u_{rr})^{-1} \text{ with } \hat{R}^u_{xr} = \frac{1}{t_{max} - t_{min}} \sum_{t=t_{min}}^{t_{max}} \underline{x}(t)\underline{r}^u_L(t)^H \text{ and} \quad (40)$$

$$\hat{R}^u_{rr} = \frac{1}{t_{max} - t_{min}} \sum_{t=t_{min}}^{t_{max}} \underline{r}^u_L(t)\underline{r}^u_L(t)^H$$

Writing $\underline{b}^{M0}(t) = \underline{x}(t) - H_u \underline{r}^u_L(t)$ it is deduced from this that the covariance matrix of this noise+interferers vector is equal to:

$$\hat{R}^u_{bb} = \frac{1}{t_{max} - t_{min}} \sum_{t=t_{min}}^{t_{max}} \underline{b}^{M0}(t)\underline{b}^{M0}(t)^H \quad (41)$$

$$= \hat{R}_{xx} - \hat{H}_u \hat{R}^{uH}_{xr} = \hat{R}_{xx} - \hat{R}^u_{xr}(\hat{R}^u_{rr})^{-1} \hat{R}^{uH}_{xr}$$

with $\hat{R}_{xx} = \frac{1}{t_{max} - t_{min}} \sum_{t=t_{min}}^{t_{max}} \underline{x}(t)\underline{x}(t)^H$ $\hat{R}^u_{bb} = \hat{R}_{xx} - \hat{R}^u_{xr}(\hat{R}^u_{rr})^{-1} \hat{R}^{u+}_{xr}$ Since the matrices $\hat{H}_m^u$ are sub-blocks of the matrix $\hat{H}_u$, when $\hat{H}_u = [\hat{H}_1^u \ldots \hat{H}_{M0}^u]$ is verified, they are extracted directly from $\hat{H}_u$ by the selection of the right columns. Thus, the useful signals have been separated and the covariance matrix $\hat{R}^u_{bb}$ of the noise+interferers component has been estimated. It is observed that, to estimate the matrices $\hat{R}^u_{bb}$ and $\hat{H}_m^u$, the matrix $\hat{R}^u_{rr}$, which is the covariance matrix of the vector $\underline{r}^u_L(t)$, is brought into play. This matrix, according to (13) and (14), has the following structure:

$$\hat{R}^u_{rr} = \begin{bmatrix} \hat{r}_{11}(0) & \cdots & \hat{r}_{11}(L)^* & \cdots & \hat{r}_{M_01}(L)^* \\ \cdots & \cdots & & & \\ \hat{r}_{11}(L) & \hat{r}_{11}(0) & & & \\ \cdots & & \cdots & & \cdots \\ \hat{r}_{M_01}(0) & \cdots & \hat{r}_{M_01}(-L) & \hat{r}_{M_0M_0}(0) & \\ \cdots & & & \cdots & \\ \hat{r}_{M_01}(L) & \cdots & \hat{r}_{M_01}(0) & \cdots & \hat{r}_{M_0M_0}(L_T) & \cdots & \hat{r}_{M_0M_0}(0) \end{bmatrix} \quad (42)$$

It is seen that the matrix brings into play intercorrelation terms $\hat{r}_{ij}(T)$ between the reference signals $d_i(t)$ and $d_j(t-T)$ such that:

$$\hat{r}_{ij}(T) = \frac{1}{t_{max} - t_{min}} \sum_{t=t_{min}}^{t_{max}} d_i(t)d_j(t-T)^* \quad (43)$$

This means that the multiple-user method makes use of the correlation coefficients $\hat{r}_{ij}(T)$ between the reference signals which are not necessarily zero. From this fact, it can be intuitively verified that the use of the coefficients $\hat{r}_{ij}(T)$ is necessary to separate the reference signals $d_i(t)$ and $d_j(t)$ in the correlated case.

Advantageously, as compared with the methods described in the prior art, the test works in the presence of spatially non-white noise $\underline{b}^{M0}(t)$. Indeed, in practice, the noise does not have this property: It consists of the noise from the receivers, whose covariance matrix may be measured, and of the non-measurable atmospheric noise consisting, in particular, of the interferers.

In this test, the knowledge of the reference signals $d_m(t)$ for $1 \leq m \leq M_0$ of the useful signals makes it possible to measure the covariance matrix of the atmospheric noise and, therefore, to apply a statistical detection test.

What is claimed is:

1. A method for the detection of $M_0$ sources common to several observation vectors $\underline{u}(t)$ and $\underline{v}(t)$ having different lengths $N_1$ and $N_2$, wherein the method comprises at least the following steps:

defining a law of likelihood $V_{uv}([M=M_0]/M_0)$ substantially equal to a chi-2 law with $2(N_1-M_0)(N2-M_0)$ degrees of freedom with $N1 \leq N_2$, dim$\{\underline{u}(t)\} = N_1 \times 1$ and dim$\{\underline{v}(t)\} = N_2 \times 1$, determining a detection threshold $\alpha_m$ in order to obtain a low probability of false alarms and a number of degrees of freedom that takes account of the lengths $N_1$ and $N_2$ and of the number of sources $M_0$, and determining the presence and/or the number of the sources $M_0$ in applying the law of likelihood and the threshold $\alpha_m$.

2. A method according to claim 1, wherein the observation vector $\underline{v}(t)$ is determined from the observation vector $\underline{u}(t)$.

3. A method according to claim 1 wherein:

the signals sent out by the different sources $M_0$ comprise a reference sequence d(t), a reference vector $\underline{r}_L^1(t-t_0)$ is taken as the observation vector $\underline{u}(t)$ with $N_1=L$ and a vector $\underline{x}(t)$ received at the sensors is taken as the observation vector $\underline{v}(t)$ with $N_2=N$ (L corresponds to the number of time shifts of the reference signal), the synchronization position or positions are determined.

4. A method according to one of the above claims, comprising a step for determining a number Pm of multipaths for a given transmitter m in searching for consistency between observations $\underline{x}^m(t)$ and the reference vector $\underline{r}_L^m(t)$ and verifying $\underline{u}(t)=\underline{r}_L^m(t)$ and dim$\{\underline{u}(t)\}N_1 \times 1$ with $N_1=L$.

5. A method according to claim 4 comprising a single-reference or multiple-reference direction-finding step.

6. Application of the method according to claim 1 to the determining of the presence and/or the number of sources common to at least two observations having different lengths in a GSM type radiocommunications system.

7. Device to determine the presence and/or the number of sources common to at least two observation vectors $\underline{u}(t)$ and $\underline{v}(t)$ comprising at least means adapted to implementing the steps of claim 1.

* * * * *